Oct. 22, 1968  O. H. V. LANGE  3,406,497

STEAM GENERATOR AND SEPARATOR

Filed March 20, 1967  2 Sheets-Sheet 1

Oct. 22, 1968  O. H. V. LANGE  3,406,497

STEAM GENERATOR AND SEPARATOR

Filed March 20, 1967  2 Sheets-Sheet 2

3,406,497
STEAM GENERATOR AND SEPARATOR
Olof Harald Vilhelm Lange, Malmo, Sweden, assignor to Aktiebolaget Atomenergi, Stockholm, Sweden
Filed Mar. 20, 1967, Ser. No. 624,590
Claims priority, application Sweden, Mar. 31, 1966, 4,342/66
3 Claims. (Cl. 55—204)

ABSTRACT OF THE DISCLOSURE

A steam generator and separator which receives hot pressurized water from a heating apparatus, such as a nuclear reactor, generates steam from and centrifugally separates said steam from said hot pressurized water, and returns the water to the heating apparatus without the use of a pump.

---

The invention is concerned with a steam generator and separator. It is the general object of the invention to provide a steam generator and separator which receives hot pressurized water from a heating apparatus, such as a nuclear reactor, generates steam from said hot pressurized water, and returns the water to the heating apparatus without the use of a pump. It is a particular object of the invention to provide a steam generator and separator which operates with such a high degree of officiency as is required for applying the invention on such water-cooled nuclear reactors, which offer a high flow resistance to the cooling water.

The device according to the invention comprises a housing having two opposite walls and a circular peripheral wall, an annular inlet for hot pressurized water in at least one of said opposite walls, said annular inlet having a diameter considerably less than that of the circular peripheral wall, said annular inlet comprising a plurality of openings directed to give a rotary movement to the water, so as to produce in said housing a rotating body of water surrounding a central zone of steam, a steam outlet provided in the centre of at least one of said opposite walls for the discharge of steam from said central zone of steam, at least one water outlet provided in said circular peripheral wall, and a plurailty of baffle members forming an annular baffle means having a diameter larger than that of said annular inlet but less than that of said circular peripheral wall, for transforming the kinetic energy of the rotary body of water into a pressure in said water outlet which is higher than the pressure in said water inlet.

Figure 1:
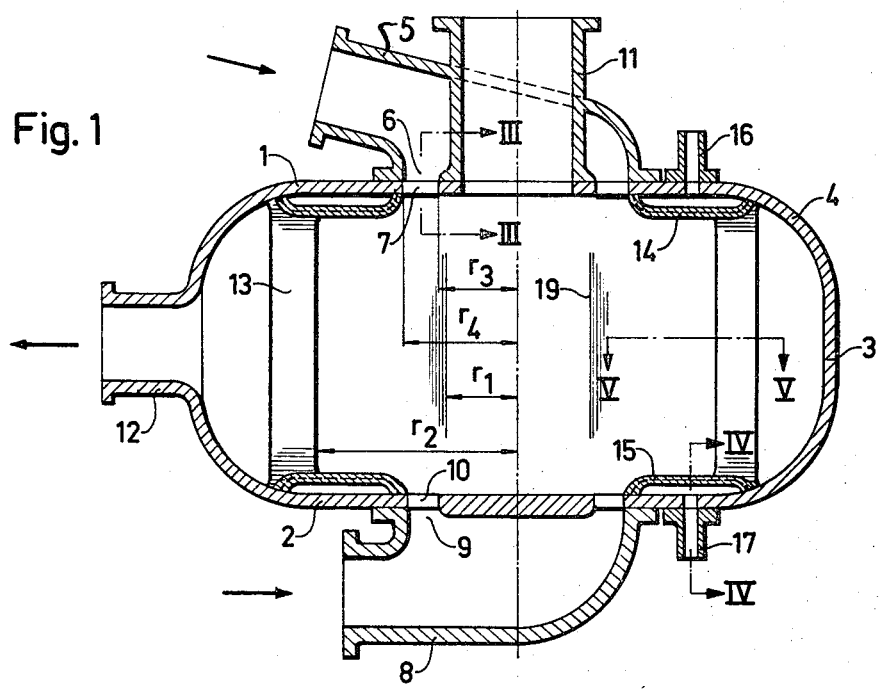
Figure 2:
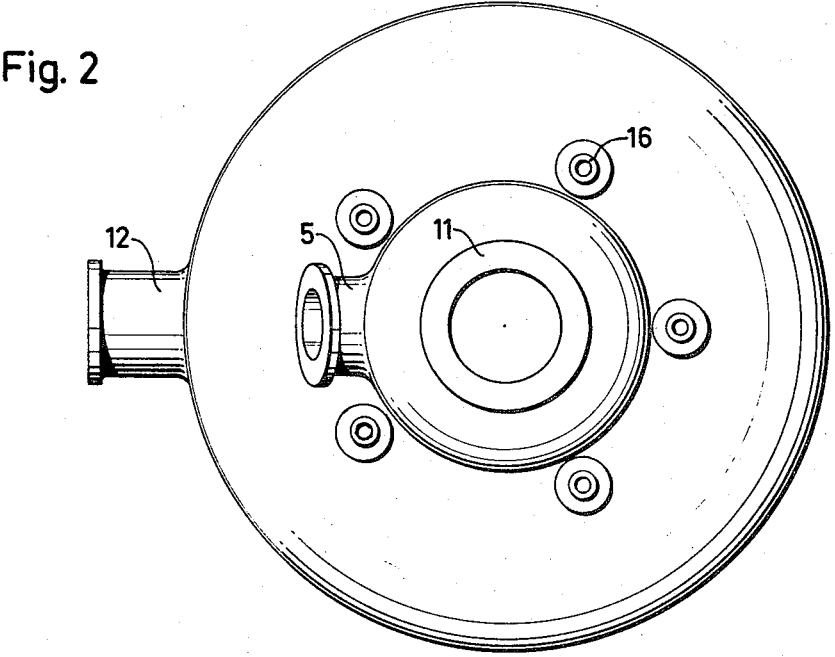
Figure 3:
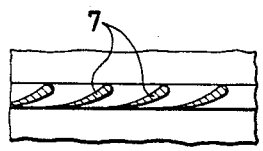
Figure 4:
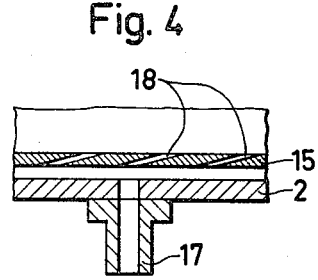
Figure 5:
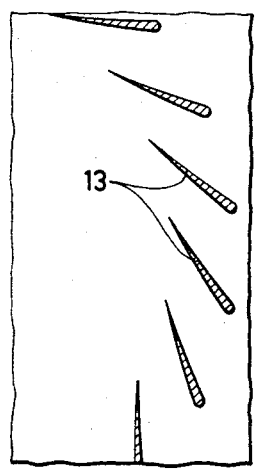
Figure 6:
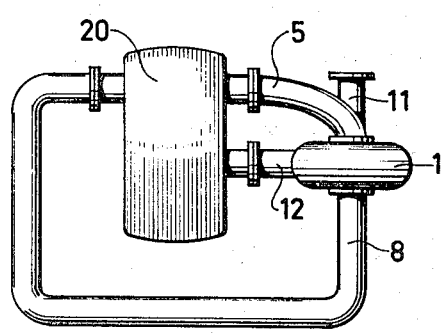

The invention will be explained below with reference to the appended drawing showing an example of the steam generator and separator. FIG. 1 shows a central section through the device. FIG. 2 shows the device from above. FIGS. 3, 4, and 5 show sections along the lines III—III, IV—IV, and V—V in FIG. 1. FIG. 6 shows the combination of a nuclear reactor and the steam generator and separator.

The drawing shows a steam generator and separator consisting of a top wall 1, a bottom wall 2, a cylindric side wall 3, and rounded walls 4 between the side wall and the top and bottom walls. The top wall 1 contains an annular inlet aperture 6 for hot pressurized water from a nuclear reactor. The water is supplied through a tube 5. In the inlet aperture 6 baffle plates 7 are arranged, the design of which is shown in FIG. 3. In the bottom wall 2 there is a similar annular inlet aperture 9 having baffle plates 10. Hot water from the reactor is supplied through a tube 8.

Centrally positioned in the top wall 1 of the steam generator and separator there is an outlet 11 for generated steam. In the side wall 3 of the steam generator there is an outlet 12 for water. The housing 1, 2, 3, 4, of the steam generator and separator contains an annular baffle means consisting of a plurality of baffle plates 13 extending between the top and bottom walls of the housing. The diameter of the baffle means is approximately 2.5 times that of the annular water inlet 6, and should generally be 2–5 times said diameter. On the inside of the top and bottom walls 1, 2 there are rounded walls 14, 15 extending from the outer edge of the annular water inlets 6, 9 to the rounded wall sections 4 of the housing. Water can be supplied or discharged from the space between said walls 14, 15 and the top and bottom walls 1, 2 through tubes 16, 17. The walls 14, 15 contain apertures 18, see FIG. 4.

The illustrated steam generator and separator operates in the following way. The hot water supplied from the nuclear reactor 20 through the tubes 5, 8 is brought into a rapid rotation by the baffle members 7, 10. Simultaneously, the pressure of the water is reduced, resulting in steam being generated. The expansion of the steam results in an increase of the velocity of the water. The water forms a rotary body, having its surface at 19. The generated steam leaves through the outlet 11. The fast rotating body of water moves outwardly in the housing. The friction against the walls of the housing is reduced by supplying or discharging water through a tube 16, 17, the creation of a stationary interphase at the wall being prevented.

As the water approaches the periphery of the housing the kinetic energy thereof is transformed into pressure. The annular baffle means 13 makes it possible for said transformation of energy to take place without any significant loss of energy. At the outlet 12 the water has regained such a high pressure that it can normally be returned to the reactor 20 without a pump. A circulation pump, not illustrated, having a relatively low output is used merely during starting and stopping of the reactor.

The steam generator and separator performs at its best when the free water surface 19 is positioned at about the inner edge of the annular water inlets 6, 9. At excessive supply of water the water surface is moved inwardly, which results in water being carried away with the leaving steam. It is then possible to restore the water surface to the desired position by reducing the water supply. Alternatively, the position of the water surface can be controlled and regulated by means of a level controller arranged in the steam generator and separator.

The steam generator and separator shown has a vertical axis. However, the axis can also be positioned horizontally.

What is claimed is:
1. A steam generator and separator, comprising a housing having two opposite walls and a circular peripheral wall having rounded portions, an annular inlet for hot pressurized water in each of said opposite walls, said annular inlets having a diameter considerably less than that of the circular peripheral wall, said annular inlets comprising a plurality of openings directed to give a rotary movement to the water, so as to produce in said housing a rotating body of water surrounding a central zone of steam, a steam outlet provided in the centre of at least one of said opposite walls for the discharge of steam from said central zone of steam, at least one water outlet provided in said circular peripheral wall, and a plurality of baffle members extending between said opposite walls and forming an annular baffle means having a diameter larger than that of said annular inlets but less than that of said circular peripheral wall, for transforming the kinetic energy of the rotary body of water into a pressure in said water outlet which is higher than the pressure in said water inlets.

2. A steam generator and separator according to claim 1, characterized in that at least one of said opposite walls adjacent the water inlet is provided with a perforated wall, and that means are provided for discharging or supplying water through said perforated wall, to lower the friction between said perforated wall and the rotary body of water.

3. A steam generator and separator as defined in claim 1 in which the annular baffle means has a diameter which is 2–5 times that of the annular water inlet.

References Cited

UNITED STATES PATENTS 1,896,896  2/1933  Hawley _____ 55—396
3,117,557  1/1964  Hoffstrom _____ 122—40 X REUBEN FRIEDMAN, Primary Examiner.

R. W. BURKS, Assistant Examiner.